June 30, 1931.   A. F. VICTOR   1,812,068
FOOTAGE INDICATOR FOR MOTION PICTURE CAMERAS
Filed May 17, 1929
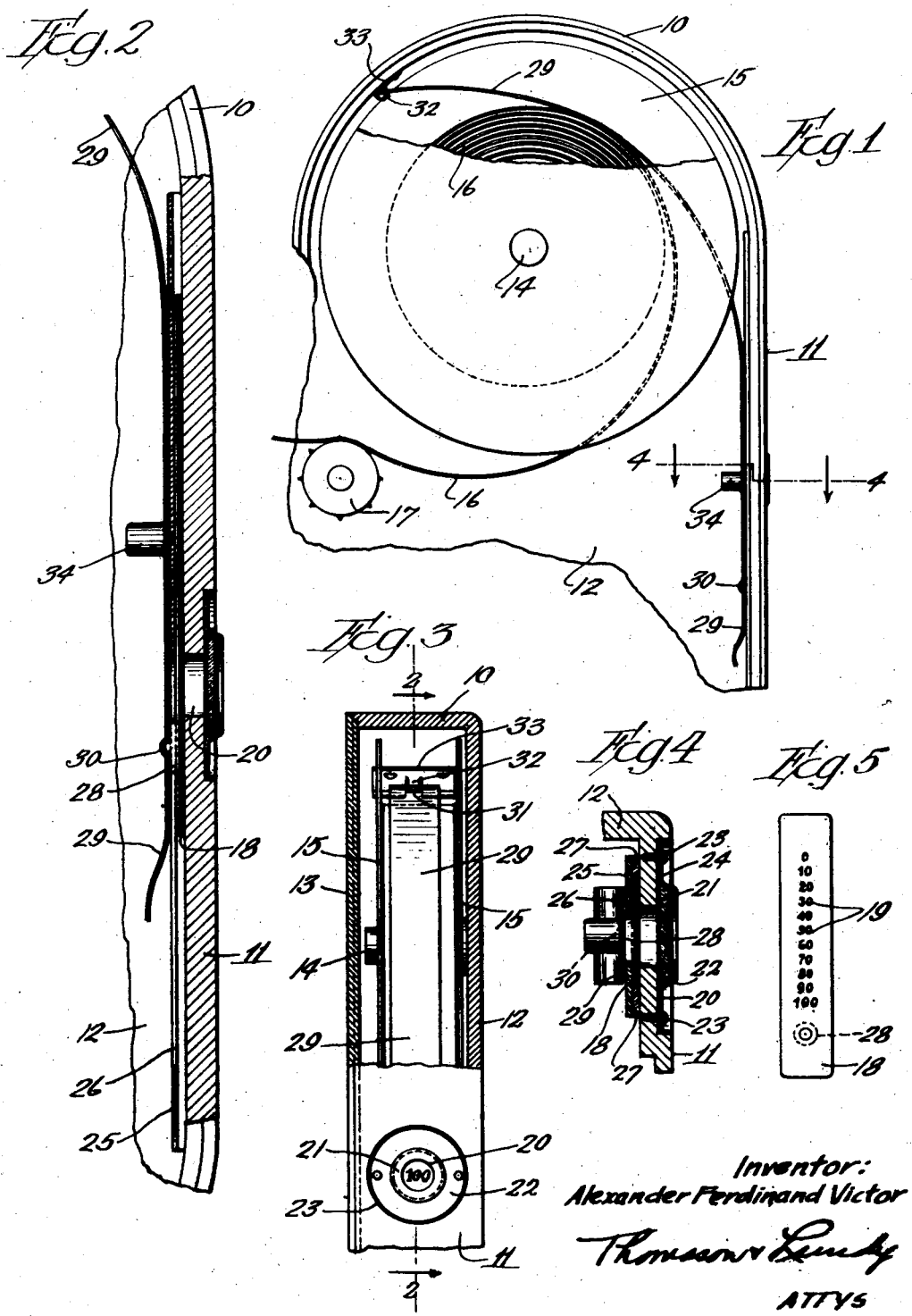
Inventor:
Alexander Ferdinand Victor
Thomas Lundy
ATTYS Patented June 30, 1931

1,812,068

UNITED STATES PATENT OFFICE

ALEXANDER FERDINAND VICTOR, OF NEW YORK, N. Y.

FOOTAGE INDICATOR FOR MOTION-PICTURE CAMERAS

Application filed May 17, 1929. Serial No. 363,767.

My present invention relates to a device for automatically and visually indicating to the operator the quantity of unused film remaining upon the reel or spool in a motion-picture camera or other cinematographic apparatus. In motion-picture cameras and the like the sensitized film is stored upon a spool or reel that is mounted within the light-proof housing of the camera and the film unwound therefrom during the making of the successive photographic exposures. The spool or reel is of course invisible from the exterior of the camera and the operator therefore cannot ascertain with any degree of accuracy the length of the unexposed portion of the film that may remain upon the spool after some of the film has been used, hence he is unable to know how much longer the camera may be operated, and he must ordinarily rely on guess-work, which of course is not dependable. In order to avoid this indefinite situation, and to permit the operator to readily ascertain at all times the length of the unexposed portion of the film remaining upon the spool, I have designed an indicator that is controlled by the varying diameter of the body of film upon the spool and in connection therewith I utilize a scale that is visible through a window in the camera housing so that the operator may instantly ascertain the footage of the unexposed film. This device is simply constructed; it is readily operated without danger of marring or injuring the film; it is effective in operation so that the user may depend upon the readings made from the scale; and it is compact in the arrangement of the parts, so that it will not interfere with the other portions of the camera and may be manufactured at a small production cost that will not increase the selling price of the camera.

The foregoing are a few of the objects of my device, and I prefer to carry out my invention and to accomplish the numerous objects thereof in substantially the manner hereinafter fully described and as more fully pointed out in the claims, reference being herein made to the accompanying drawings that form a part of the specification.

In the drawings:—

Figure 1 is an interior view in elevation of the spool or reel chamber of a motion-picture camera and showing my invention incorporated therein.

Figure 2 is an enlarged vertical longitudinal section of the major portion of my indicator device, the view being taken on line 2—2 of Figure 3 and looking in the direction of the arrows.

Figure 3 is an elevation of the structure shown in Figure 1 with a portion of the housing broken away for clearness.

Figure 4 is an enlarged transverse section taken on line 4—4 of Figure 1 and looking in the direction indicated by the arrows.

Figure 5 is a face view of the indicator or scale plate detached from the other parts.

The accompanying drawings disclose a typical or preferred form of my invention, and they are merely schematic for the purpose of illustration. In these drawings I have employed the same reference characters to designate like parts wherever they appear throughout the several views.

The spool or reel chamber of the camera includes a curved or segmental wall 10, a straight wall 11 continuing tangent therefrom, a side wall 12 formed integral with and transverse to the first-named walls, and a removable plate or closure 13. A reel-mount spindle 14 projects from the side wall 12 at about the radial center of the segmental wall which rotatably carries the spool 15 upon the hub or core of which and between the flanges thereof the ribbon or film 16 is wound. The film is withdrawn or unwound from the spool by passing the same into engagement with a drive-sprocket 17 the radial teeth of which enter the marginal perforations in the film and advance the film to the intermittent feed mechanism (not shown). During the unwinding of the film from the spool the diameter of the body of the film on the hub or core gradually reduces, and it is this function that I have utilized to actuate or control the indicator.

I prefer to employ an elongated flat plate 18 as the indicator element and upon this plate there is etched or engraved in a vertical column 19 a series of numerals of the tens order from "0" at the top to "100" at the bottom of the column to represent the successive amounts of film footage that is unused. The plate is positioned against the inner surface of the tangent housing wall 11 with its indicia bearing face towards the adjacent face of said wall, and in this position said plate is operated as a slide to be moved up and down back of the circular aperture 20 in the adjacent portion of the wall 11. The aperture is closed by a glass or other transparent disk 21 that is of larger diameter than said aperture and which is maintained in position by an annular bezel 22 that is clamped by screws 23 in a circular shaped recess or depression 24 made in the outer surface of wall 11 surrounding the aperture 20. When the indicia-bearing slide plate is in different positions back of the aperture 20 the numerals on the plate may be read through said aperture and the length of the exposed portion of the film may be instantly ascertained.

In order to maintain the slide-plate 18 in proper position relative to the wall 11 and the aperture 20 a guideway is provided which consists of a strip of metal 25 having a longitudinal slot 26 therein, and along the opposite longitudinal edge portions thereof are spacers 27 that separate the strip 25 from the inner surface of wall 11 and the opposing edges of the spacers are far enough apart to permit of the free travel of the slide plate between them. This structure provides dependable means for guiding the slide plate in its movement up and down back of the viewing aperture 20. The slide plate, adjacent its lower end, is provided with a stub 28 that projects through the slot 26 in the strip 25 so that the adjacent lower portion of an elongated flat metal spring 29 may be connected thereto by a screw 30. This spring is normally straight, that is, prior to assembly in the housing it is not bowed but it is mounted in the camera its upper end is curved from the straight wall 11 or the guideway to a point upon the opposite portion of the segmental wall 10 which is beyond the vertical plane of the reel-mount spindle 14, where its end is anchored so that its intermediate portion is positioned between the flanges of the reel or spool 15 is in contact with the unwound portion of the film 16 on said reel or spool. The upper end of the spring is pivotally or hingedly connected with the segmental wall 10 by providing a hole 31 near its end edge to receive a stamped-out open hook 32 in a hinge-plate 33 secured to the inner surface of the segmental wall in the manner illustrated in Figures 1 and 3 of the drawings. When thus assembled the tendency of the spring 29 is to straighten or flatten between its anchored end and its connection with the sliding indicator plate 18, but it is prevented from so doing because of its contact with the roll of film.

When a full reel or spool is being mounted on the spindle 14 the spring is bowed into a smaller curve by pushing the same upwardly into contact with the segmental wall 10 which may be readily accomplished by means of a finger grasp in the form of a stud 34 secured to and projecting from the spring above the point where it is connected with the sliding indicator plate. The spring is thereafter released and will bear against the outer surface of the film which positions the numeral "100" in aperture 20 and as the film is unwound from the reel or spool the spring will approach the axis of the spool thus moving the indicator plate 18 downwardly in the guideway so that the next numeral "90," and then "80" will successively appear through the aperture 20 in the housing wall. The spring will continue to approach the axis of the spool and the indicator plate will move downwardly until the end of the film is reached at which point the indicator will show "0" through the aperture. Thus it will be seen the device is automatic in operation and is automatically set at both the start and at the end of each reel of film mounted in the camera. In lieu of the flat metal spring I may employ a bowed wire, or any other flexible means may be utilized to connect the slidable indicator plate with an opposite portion of the housing with the intermediate portion of the flexible element in contact with the film upon the spool.

The structure I have herein disclosed is susceptible of modification to adapt the same to the structural characteristics of other cameras, or other motion-picture apparatus; and it will be understood that the foregoing is merely for the purpose of description and no limitations therein should be read into the claims, but said claims should be construed as broadly as possible in view of the prior art.

What I claim is:—

1. The combination with a film receiving roll, of a scale, means by which the characters on said scale are successively exposed to view, and devices for causing a relative movement between said means and said scale and including a flexible resilient element anchored at one end and connected to the scale at the other end and intermediate its ends adapted to contact with the film on the roll.

2. The combination with a film receiving roll, of an elongated flexible resilient member anchored at one end adjacent the roll of film and intermediate its ends adapted to contact with the film on the roll, a scale, and means by which the characters on said scale are successively exposed to view, a portion of said flexible member remote to its anchored end having operative connection with one of the two last-mentioned elements, whereby a change in the diameter of the film on the roll causes a relative movement between said two last-mentioned elements.

3. The combination with a film receiving roll, of an elongated flexible resilient member anchored at one end, a slidable scale connected to the other end of said member, and means for guiding said scale, which means has an aperture through which the scale is exposed to view, a portion of the flexible member intermediate its ends adapted to contact with the film on the roll, whereby a change in diameter of the roll may be read upon the scale through said aperture.

4. The combination with a film receiving roll of a slidable scale, an elongated spring member anchored at one end and connected to the scale at its other end, devices for guiding said scale having means through which the scale is exposed to view, said spring member being bowed intermediate its ends and adapted to contact with the film on the roll, whereby the unwinding of the film from the roll changes the position of the scale with respect to the viewing means.

5. The combination with a film receiving roll, and a housing within which said roll is rotatably mounted, said housing being provided with a viewing aperture in one of its walls, of a guide structure extending upon opposite sides of said aperture, a scale plate slidable in said guide behind said aperture, and a flexible resilient member anchored at one end to said housing remote to said aperture and connected to the scale at the other end, and an intermediate portion of said member adapted to contact with the film on the roll, whereby the unwinding of the film from the roll is indicated on said scale through said aperture.

6. The combination with a film receiving roll, and a housing within which said roll is rotatably mounted, said housing being provided with a viewing aperture in one of its walls, of a guide structure extending upon opposite sides of said aperture, a scale plate slidable in said guide behind said aperture, and an elongated flat spring hingedly secured at one end to the housing and connected to said scale plate at the other end, an intermediate portion of said spring being bowed and adapted to contact with the film on the roll, whereby the unwinding of the film from the roll tends to straighten the spring and thereby changes the position of the scale with respect to the aperture.

Signed at Chicago, in the county of Cook and State of Illinois, this 5th day of May, 1928.

ALEXANDER FERDINAND VICTOR.